(12) United States Patent
Schwarz et al.

(10) Patent No.: US 10,160,309 B2
(45) Date of Patent: Dec. 25, 2018

(54) AIR GUIDING DEVICE FOR A MOTOR VEHICLE

(75) Inventors: Josef Schwarz, Worms (DE); Torsten Mathes, Fürfeld (DE)

(73) Assignee: Röchling Automotive SE & CO. KG, Mannheim (DE)

( * ) Notice: Subject to any disclaimer, the term of this patent is extended or adjusted under 35 U.S.C. 154(b) by 1138 days.

(21) Appl. No.: 13/542,158

(22) Filed: Jul. 5, 2012

(65) Prior Publication Data

US 2013/0012115 A1  Jan. 10, 2013

(30) Foreign Application Priority Data

Jul. 5, 2011 (DE) .................. 10 2011 078 691

(51) Int. Cl.
*B60K 11/08* (2006.01)

(52) U.S. Cl.
CPC ............. *B60K 11/085* (2013.01); *Y02T 10/88* (2013.01)

(58) Field of Classification Search
CPC .................................. B60K 11/04; B60H 1/34
USPC .............. 454/155, 145, 154, 166; 180/68.1
See application file for complete search history.

(56) References Cited

U.S. PATENT DOCUMENTS

| | | | | |
|---|---|---|---|---|
| 1,774,448 A * | 8/1930 | McKnight | .................. | 454/145 |
| 2,987,981 A * | 6/1961 | Boylan | .................. | 454/154 |
| 3,098,365 A | 7/1963 | Pearson | | |
| 3,609,994 A | 10/1971 | Colletti et al. | | |
| 3,802,328 A * | 4/1974 | Kakizaki | .................. | 454/154 |
| 5,127,238 A * | 7/1992 | Ichikawa et al. | .................. | 62/244 |
| 5,297,989 A * | 3/1994 | Stouffer et al. | .................. | 454/155 |
| 5,356,336 A * | 10/1994 | Stouffer et al. | .................. | 454/155 |
| 6,439,328 B1 * | 8/2002 | Vaillancourt et al. | ........ | 180/68.1 |
| 8,161,919 B2 * | 4/2012 | Klotz et al. | .................. | 123/41.04 |
| 8,307,932 B2 * | 11/2012 | Steller et al. | ................. | 180/68.1 |
| 8,505,660 B2 * | 8/2013 | Fenchak et al. | ............. | 180/68.1 |
| 2005/0133287 A1 * | 6/2005 | Schmid et al. | ............. | 180/68.1 |
| 2006/0102399 A1 * | 5/2006 | Guilfoyle et al. | ........... | 180/68.1 |
| 2010/0071977 A1 * | 3/2010 | Ritz et al. | .................... | 180/68.1 |
| 2010/0243352 A1 | 9/2010 | Watanabe et al. | | |
| 2011/0048691 A1 * | 3/2011 | Shin et al. | .................... | 165/299 |
| 2011/0070817 A1 * | 3/2011 | Walters | ......................... | 454/155 |
| 2012/0060776 A1 * | 3/2012 | Charnesky et al. | ....... | 123/41.05 |

(Continued)

FOREIGN PATENT DOCUMENTS

| | | |
|---|---|---|
| EP | 2407333 A1 | 1/2012 |
| WO | 2006056359 A1 | 6/2006 |
| WO | 2008094731 A2 | 8/2008 |

*Primary Examiner* — Steven B McAllister
*Assistant Examiner* — Samantha Probst
(74) *Attorney, Agent, or Firm* — Prince Lobel Tye LLP

(57) ABSTRACT

The invention relates to an air guiding device for a motor vehicle, comprising: a support structure, a first louver, which is mounted on the support structure so as to be swivelable about a first louver axis between a closed position and an open position, a second louver, which is mounted on the support structure so as to be swivelable about a second louver axis, the first and second louver axes extending neither parallel to one another nor in collinear manner, an actuator, which is coupled or couplable to the first louver, in order to drive the latter in a swivel movement about the first louver axis, and a transmission means, which is configured to couple the first louver with the second louver in such a way as to transmit movement, wherein the transmission means is of two-part construction.

15 Claims, 4 Drawing Sheets

(56) References Cited

U.S. PATENT DOCUMENTS

Figure 1:
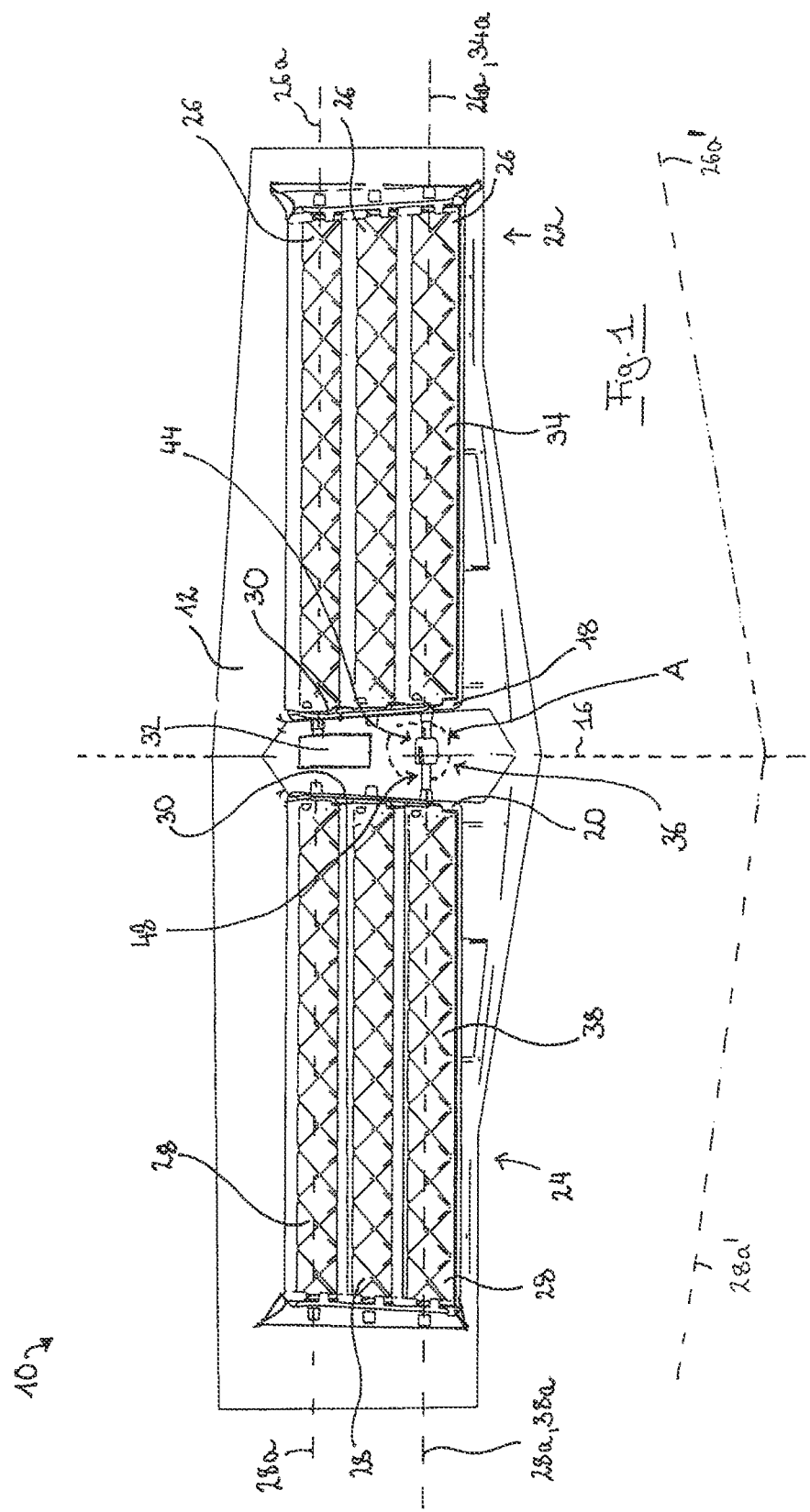

2012/0247848 A1* 10/2012 Kosaka et al. ............... 180/68.1
2012/0323448 A1* 12/2012 Charnesky et al. ............ 701/49
2013/0252531 A1*  9/2013 Asano et al. ................. 454/155

* cited by examiner

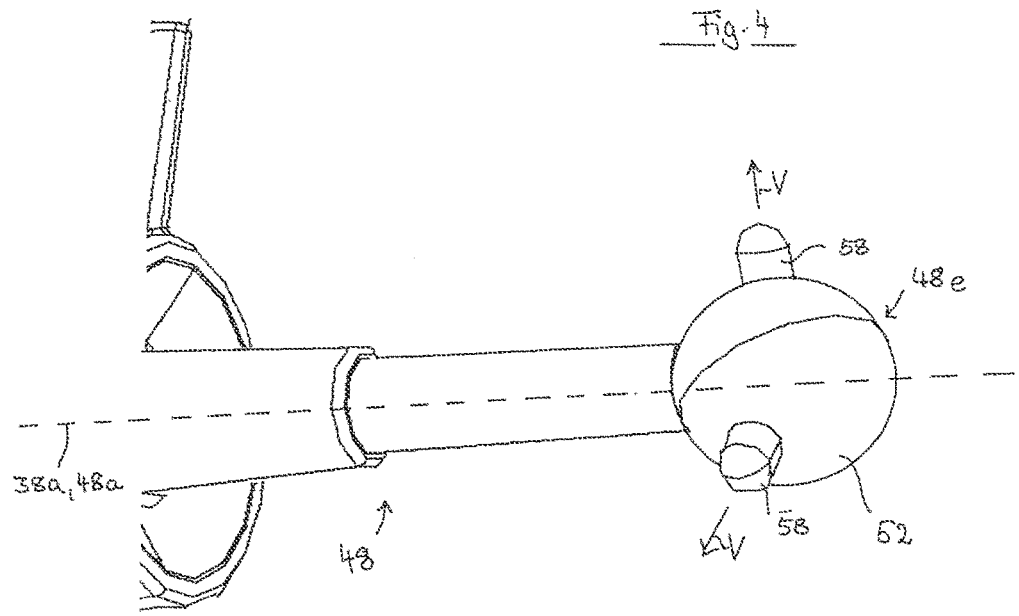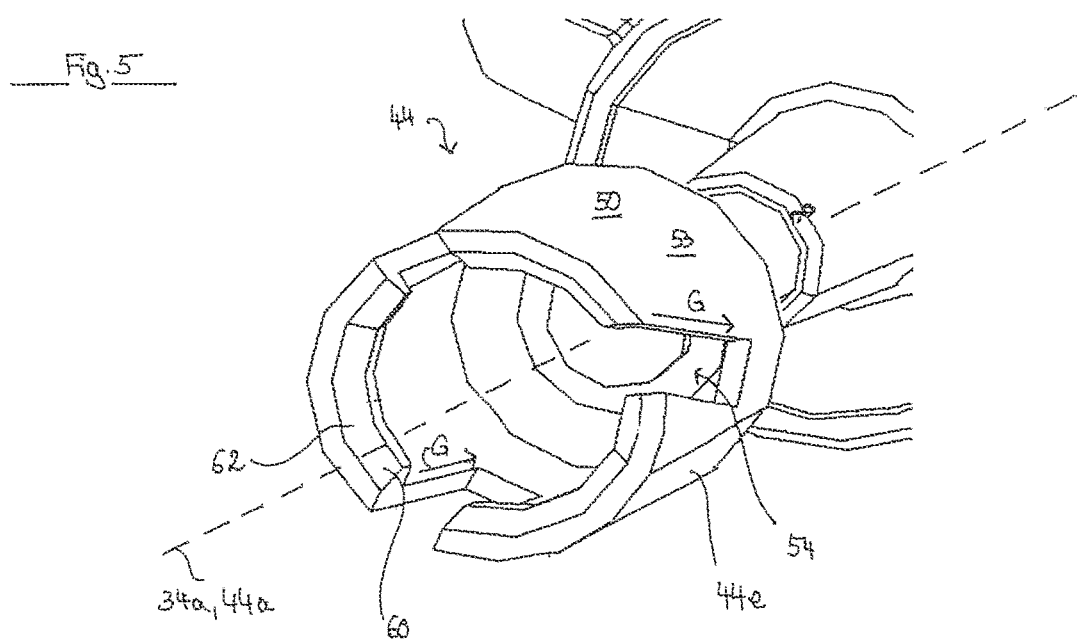

AIR GUIDING DEVICE FOR A MOTOR VEHICLE

The present invention relates to an air guiding device for a motor vehicle, which comprises a support structure and a first louvre, which is mounted on the support structure so as to be swivelable about a first louvre axis between a closed position and an open position, and a second louvre, which is mounted on the support structure so as to be swivelable about a second louvre axis, the first and to second louvre axes extending neither parallel to one another nor in collinear manner. In addition, the air guiding device comprises an actuator, which is coupled or couplable to the first louvre, in order to drive the latter in a swivel movement about the first louvre axis, and a transmission means, which is configured to couple the first louvre with the second louvre in such a way as to is transmit movement.

A very similar air guiding device is known from US document 2010/0243352 A. In the air guiding device described in this document, the first and second louvres, whose axes extend parallel to one another, however, are connected together by a substantially rigid connecting web or stay and in this way are coupled for transmitting movement.

It is known to use such a coupling mechanism in the form of a rigid connecting web also in air guiding devices whose louvre axes exhibit slight angular offset relative to one another. Provided the angular offset is not too great, it may be compensated in the case of the movement-transmitting coupling by the tolerances of the individual members, for example by slight curvature of the connecting web.

To achieve desired deformation behaviour of the air guiding device in the case of a collision and/or for adaptation to the shape of inlet openings of a predetermined ornamental grille, it may however be desirable for the angular offset between the louvre axes of the first and second louvres to be greater than can be absorbed by the individual member tolerances, such that coupling can no longer be achieved satisfactorily by way of a rigid connecting web or stay.

In the light of this prior art, the object of the present invention is to further develop the known air guiding device so as to allow structurally simple movement-transmitting coupling of louvres with a greater angular offset of the associated louvre axes.

According to the invention, to achieve this object with an air guiding device of the above-mentioned type, the transmission means is of two-part construction, with a first transmission member associated with the first louvre and connected therewith for common rotation about the first louvre axis and a second transmission member formed separately from the first transmission member, associated with the second louvre and connected therewith for common rotation is about the second louvre axis. One member of the first and second transmission members comprises a coupling end piece on which at least one coupling projection is formed, and the other member of the first and second transmission members comprises a coupling end piece on which at least one coupling recess associated with the coupling projection is formed. The coupling projection extends in a projection direction which has a component orthogonal to the louvre axis of that louvre with which is associated the transmission member with the coupling projection. The coupling recess extends in a sliding direction which has a component parallel to the louvre axis of that louvre with which is associated the transmission member with the coupling recess. The coupling projection is in sliding contact engagement with the coupling recess in the sliding direction and in form-fitting engagement in a direction orthogonal to the sliding direction.

The two-part embodiment of the transmission means enables the first and second transmission members to move relative to one another in the event of common rotation about the first or second louvre axis, such that this relative movement compensates the angular offset and maximally synchronous coupling of the rotational movements is nonetheless achieved.

On rotational movement about the associated louvre axis, the coupling projection moves in the associated coupling recess in the sliding direction; the form-fitting engagement perpendicular to the sliding direction between coupling projection and associated coupling recess, together with the sliding contact engagement, allows transmission of torques about both louvre axes. The coupling projection may then rest directly on one of the boundary walls of the coupling recess; additional rolling elements may be dispensed with.

In this way a structurally very simple coupling mechanism may be achieved, which enables the transmission of movement between louvres, the swivel axes of which have a greater angular offset than was possible hitherto according to the prior art.

According to a preferred further development of the present invention, provision is may be made such that, in a situation in which the air guiding device is fitted in the motor vehicle, the first and second louvre axes are tilted relative to one another both in the projection onto a plane perpendicular to the longitudinal direction of the vehicle and in the projection onto a plane parallel to the carriageway. The above-described coupling mechanism is particularly suitable for vehicles in which, for technical or aesthetic reasons, such tilting in the two stated projections or planes is desired, since with such air guiding devices the angle which the two louvre axes effectively form with one another may be particularly large.

Provision may be made for the first transmission member to extend parallel, preferably collinearly, to the first louvre axis and/or for the second transmission member to extend parallel, preferably collinearly, to the second louvre axis. In the event of rotational movement of the louvres about their respective louvre axes, the transmission members consequently rotate about their respective longitudinal axes, or a rotating movement about the respective louvre axis is merely superimposed on said movement, simplifying the coupling between the individual movements of the two transmission members.

A stable coupling may be brought about by configuring one coupling end piece as a coupling inner part, preferably in the manner of a joint head, and configuring the other coupling end piece as a coupling outer part, preferably in the manner of a joint socket, the coupling inner part being accommodated at least in part in the coupling outer part.

The in each case one-piece construction of the first transmission member and/or the second transmission member makes it possible simply to produce particularly stable transmission members.

Particularly effective torque transmission may be achieved in that the projection direction extends orthogonally to the louvre axis of that louvre with which is associated the transmission member with the coupling projection.

To simplify assembly of the air guiding device, provision may additionally be made for the sliding direction to extend, for at least one coupling recess, in a plane which is defined by the projection direction of the coupling projection associated with the coupling recess and by the louvre axis of that louvre with which is associated the transmission member with the associated coupling projection.

The force which acts on a coupling projection in the event of torque-transmitting rotational movement of the transmission means may be reduced if the transmission means comprises a plurality of coupling projections and a plurality of coupling recesses, each coupling projection coming into engagement with an associated coupling recess. A simple and stable coupling may for example be achieved with three coupling projections and respective associated coupling recesses.

A transmission member preferably comprises a coupling end piece, on which a plurality of coupling projections are formed, which are arranged on the coupling end piece with equidistant angular spacing about the louvre axis of the louvre associated with this transmission member. This enables particularly stable and controlled transmission of rotational movement.

According to a preferred further development, provision may also be made for a transmission member to comprise a coupling end piece, in which a plurality of coupling recesses are formed, which are provided on the coupling end piece rotationally symmetrically relative to the louvre axis of the associated louvre as axis of symmetry. In this case the two transmission members may be connected together by a screwing-in movement.

Provision may in particular be made for the first transmission member and the second transmission member to be configured for coupling together by plugging, fitting or screwing together, and for a catch element to be provided at least on one of the transmission members, which catch element prevents the is transmission members from becoming uncoupled from one another. In this way it is possible to prevent the coupling between the louvres from becoming unintentionally undone, for example in the event of unforeseen impacts against the air guiding device.

To simplify assembly by simple plugging or fitting together, provision may be made for the above-explained relationship between the sliding direction and the projection direction to apply for a plurality of or all the coupling recesses and for the coupling projections associated therewith, i.e. for the respective sliding direction to extend, for a plurality of or all the coupling recesses, in a plane which is defined by the projection direction of the coupling projection associated with the respective coupling recess and by the louvre axis of that louvre with which is associated the transmission member with the associated coupling projection.

Provision may in principle be made for the sliding direction to extend parallel to the louvre axis of that louvre with which is associated the transmission member with the coupling recess. Preferably, however, provision is made for the sliding direction also to comprise a component perpendicular to the louvre axis of said louvre. In this way, it is possible on the one hand to ensure that the first and second louvres are adjusted by somewhat different angles out of their respective closed position depending on the rotational position, i.e. that one louvre is for example somewhat ahead of the other louvre in the event of an opening movement and in the corresponding closing movement is a little behind.

In such a configuration, provision may in particular be made for one of the transmission members to be provided on the associated louvre axially adjustably relative to the louvre axis of said louvre. By means of slight axial adjustment, the position of the two louvres relative to one another may thus be finely adjusted.

In order to generate a greater air throughput through the air guiding device, provision may be made for the first louvre to be part of a first louvre arrangement, which comprises a plurality of louvres coupled for movement transmission, whose louvre axes extend parallel to the first louvre axis.

To achieve the same effect, it is additionally or alternatively possible for the second louvre part also to be part of a second louvre arrangement different from the first, which comprises a plurality of louvres coupled for movement transmission, whose louvre axes extend parallel to the second louvre axis. The louvres of a louvre arrangement may, as known from the prior art, be coupled in movement-transmitting manner by rigid connecting webs or stays.

Figure 2:
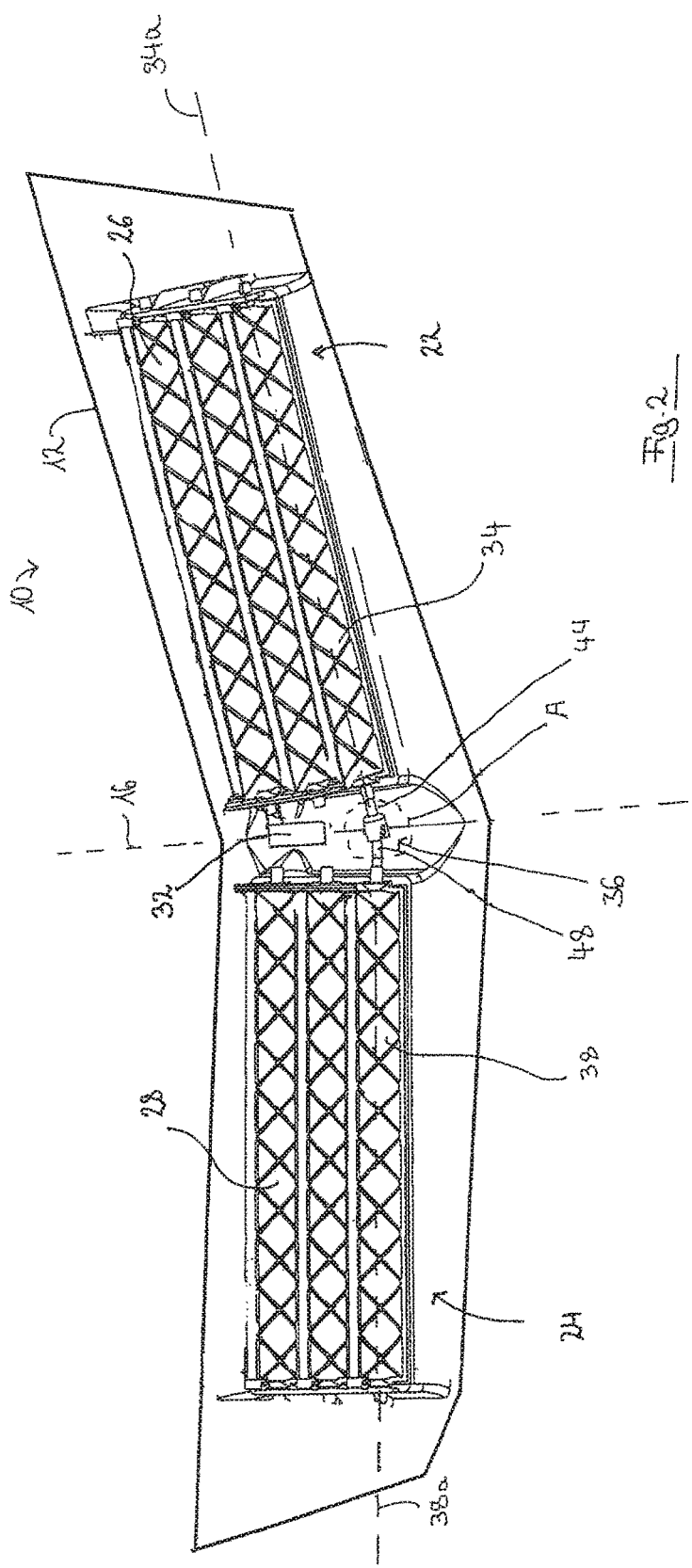
Figure 3:
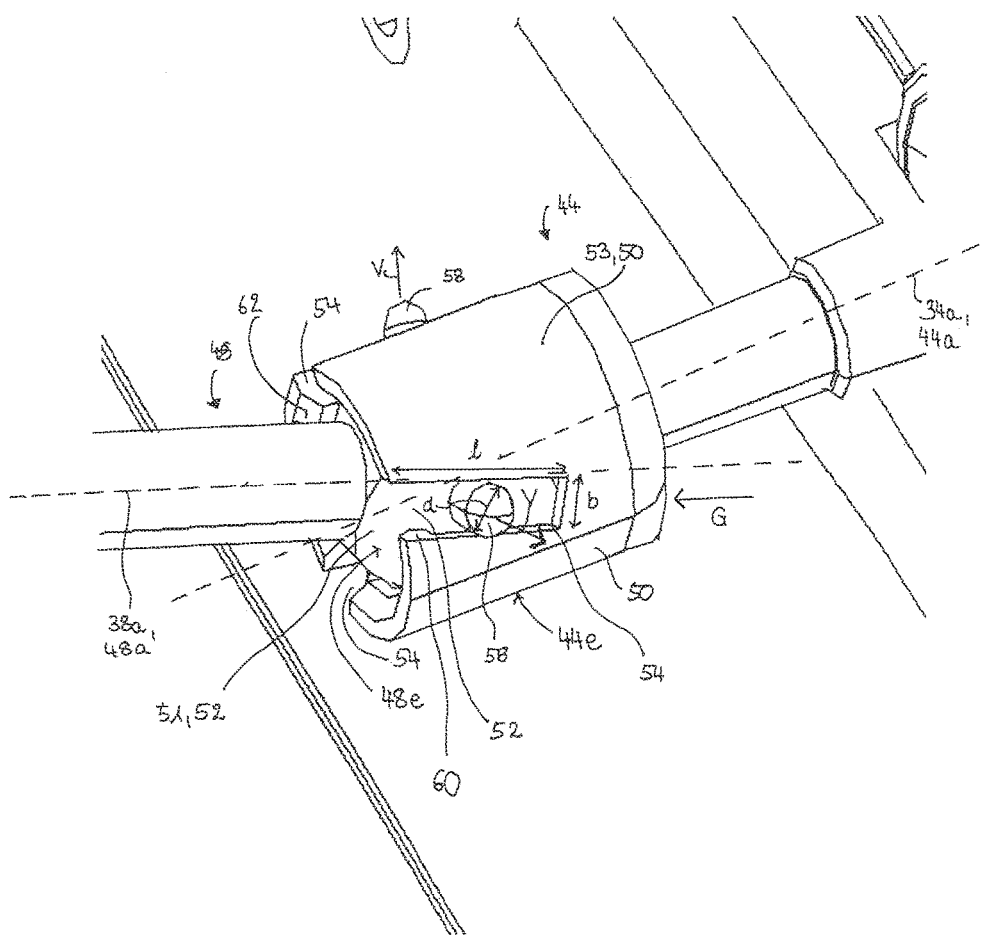

The above-described invention is described below with reference to the attached figures showing a preferred exemplary embodiment, in which:

FIG. 1 is a front view of an exemplary embodiment of the present invention in the form of an air guiding device, FIG. 2 shows the subject matter of FIG. 1 in a perspective representation from a somewhat different viewing angle, FIG. 3 shows an enlarged detail from FIG. 2, FIG. 4 shows the second transmission member of the air guiding device from FIGS. 1 to 3 and FIG. 5 shows the first transmission member of the air guiding device according to FIGS. 1 to 3 in each case in a perspective representation.

For reasons of clarity, in the figures not all the elements or features are always provided with reference numerals, but rather primarily those which are mentioned in the explanation of the respective figure. In particular where there is a plurality of very similar elements or features in a figure, they are not always all provided with reference numerals.

The figures are each simplified schematic diagrams.

FIG. 1 shows a first exemplary embodiment of the present invention in the form of an air guiding device 10 in a view allowing observation of that side of the air guiding device 10 which faces the engine compartment of the motor vehicle when installed in a motor vehicle.

The air guiding device 10 comprises a support structure 12, which may for example be made of a suitable plastics material. The support structure 12 takes the form of a frame, which may comprise a plurality of fastening structures, not shown here, which serve to mount the support structure 12 on a motor vehicle, for example by clamp connections or screwed or riveted joints.

The support structure 12 is of largely symmetrical structure relative to a centre axis 16 and comprises an opening 18 or 20, respectively, on either side of the centre axis 16, in which a first or second louvre arrangement 22 or 24, respectively, with in each case three louvres 26 or 28 is accommodated, in such a way that air throughput through the openings 18, 20 may be varied by a swivel movement of the louvres 26 and 28 about their respective louvre axes 26a or 28a when the motor vehicle is travelling.

The louvre axes 26a of the louvres 26 of the first louvre arrangement 22 in this case extend substantially parallel to one another; likewise, the louvre axes 28a of the louvres 28 of the second louvre arrangement 24 extend substantially parallel to one another.

In contrast, the louvre axes 26a and 28a of the first and second louvre arrangements exhibit an angular offset relative to one another, specifically both a (small) angular offset in the projection onto a plane perpendicular to the longitudinal direction of the vehicle (corresponding to the plane of the drawing of FIG. 1) and in the projection onto a plane parallel to the carriageway (i.e. in a projection along the centre axis 16), as is clear from a comparison of the different views of FIG. 1 and FIG. 2.

The possibility should here not be ruled out of the louvre axes of the first and second louvre arrangements also exhibiting an angular offset in the projection onto a plane perpendicular to the longitudinal direction of the vehicle which is more pronounced than in the embodiment shown in the figures, as is indicated in FIG. 1 by way of example by the straight lines 26*a*' and 28*a*'.

The louvres 26 or 28 of the first or second louvre arrangements 22 or 24 are in each case coupled together in a manner such as to transmit movement by way of a rigid connecting web or stay 30 merely indicated in the figures.

The louvres 26 of the first louvre arrangement 22 are in this case driven by an actuator 32, here illustrated only schematically, for rotation about the respective louvre axes 26*a*. An indicated louvre 26 of the first louvre arrangement 22, which is designated hereinafter as first louvre 34, is coupled for movement transmission by means of a transmission means 36 with an indicated louvre 28 of the second louvre arrangement 24, designated hereinafter as second louvre 38. The louvre axis 26*a* of the first louvre 34 is designated hereinafter as first louvre axis 34*a*. The louvre axis 28*a* of the second louvre 38 is accordingly designated second louvre axis 38*a*.

The figure shows that the transmission means 36 comprises a first transmission member 44 and a second transmission member 48, the first transmission member 44 being associated with the first louvre 34 and connected therewith for common rotation about the first louvre axis 34*a*, while the second transmission member 48 is associated with the second louvre 38 and connected therewith for common rotation about the second louvre axis 38*a*.

The transmission members 44 and 48 are coupled together in a manner resembling a bayonet closure, this being even more clearly apparent in the enlarged detail illustrated in FIG. 3 of the region designated A in FIG. 2.

As FIG. 3 shows, the transmission members 44, 48 extend along a respective transmission member longitudinal axis 44*a* or 48*a*, which extends substantially collinearly to the first or second louvre axis 34*a* or 38*a*. At in each case one longitudinal end, the first and second transmission members 44, 48 are firmly connected to the respective louvres 34, 38, while at each of the respective other longitudinal ends a coupling end piece 44*e* or 48*e* is formed.

The coupling end piece 44*e* of the first transmission member 44 is constructed as a coupling outer part 53 in the form of a substantially hollow-cylindrical joint socket 50, while the coupling end piece 48*e* of the second transmission member 48 is constructed as a coupling inner part 51 in the form of a substantially spherical joint head 52, which is accommodated at least in part in the joint socket 50.

Three coupling projections 58 distributed equidistantly around the circumference of the joint head 52 are formed on and in one piece with said joint head 52, while corresponding coupling recesses 54 are provided in the joint socket 50, which recesses take the form of elongate cut-outs, the width b of which corresponds roughly to or is somewhat greater than a diameter d of the cylindrical coupling projections 58, and extend in a sliding direction G over a length I. Alternatively, the coupling recesses could also be constructed simply as indentations on the inside of the hollow-cylindrical joint socket 50, wherein in this case the coupling projections would not be visible from outside.

It should be noted that the sliding direction G is not identical for the different coupling recesses 54. Instead, the coupling recesses 54 are arranged rotationally symmetrically relative to the first louvre axis 34*a* or relative to the axis 44*a* collinear thereto of the first transmission member 44 as axis of symmetry.

The sliding direction G of the coupling recesses 54 of the first transmission member 44 here also has a component perpendicular to the louvre axis 34*a* of the first louvre 34 associated with the transmission member 44.

As FIG. 3 shows, the coupling projections 58 are accommodated in the is coupling recesses 54 in such a way that they are each in sliding contact engagement therewith in the sliding direction G, and in form-fitting engagement perpendicular to sliding direction G.

In this way, rotation of the first transmission member 44 about the axis of rotation 44*a* may bring about rotation of the second transmission member 48 about the axis 48*a*, and thus rotation of the first louvre 34 about the first louvre axis 34*a* rotation of the second louvre 38 of the second louvre axis 38*a*, and vice versa.

Alternatively, the coupling end piece with the coupling projections could also be formed on the first transmission member and the coupling end piece with the coupling recesses on the second transmission member.

The first and second transmission members 44, 48 are again illustrated individually and on an enlarged scale in FIGS. 4 and 5. These figures reveal more clearly that the joint head 52 is of substantially spherical construction and that the coupling projections 58 protrude radially from the joint head 52. The joint socket 50 tapers slightly conically relative to the open end of the coupling end piece 44*e*, wherein a catch element 60 with a slight insertion bevel 62 is fitted at the open end. The insertion bevel 62 promotes centred introduction of the joint head 52 into the joint socket 50, and as soon as the joint head 52 has been inserted into the joint socket 50 with a degree of force, the catch element 60 prevents unintentional uncoupling of the two transmission members 44, 48 from one another.

The invention claimed is:

1. An air guiding device (10) for a motor vehicle, comprising:
   a support structure (12),
   a first louvre (34), which is mounted on the support structure (12) so as to be swivellable about a first louvre axis (34*a*) between a closed position and an open position,
   a second louvre (38), which is mounted on the support structure (12) so as to be swivellable about a second louvre axis (38*a*), the first and second louvre axes (34*a*, 38*a*) extending neither parallel to one another nor in collinear manner,
   an actuator (32), which is coupled or couplable to one of the first louvre (34) and the second louvre (38), in order to drive the latter in a swivel movement about one of the first louvre axis (34*a*) and the second louvre axis (38*a*),
   a transmission means (36), which is configured to couple the first louvre (34) with the second louvre (38) in such a way as to transmit movement,
   wherein the transmission means (36) is of two-part construction, with a first transmission member (44) associated with the first louvre (34) and connected therewith for common rotation about the first louvre axis (34*a*), and a second transmission member (48) formed separately from the first transmission member (44), associated with the second louvre (38) and connected therewith for common rotation about the second louvre axis (38*a*), wherein the second transmission member comprises a second coupling end piece (48*e*) on which at least one coupling projection (58) is formed, and the first transmission member (44) comprises a first coupling end piece (44*e*) in which at least one coupling recess (54) associated with the coupling projection (58) is formed, the coupling projection (58) extending in a projection direction (V) which has a component orthogonal to the second louvre axis (38*a*), the coupling recess (54) extending in a sliding direction (G) which rotates around and has (a) an angular component parallel to the first louvre axis (34*a*), and the coupling projection (58) being in sliding contact engagement with the coupling recess (54) in the sliding direction (G) and in form-fitting engagement in a direction orthogonal to the sliding direction (G), and wherein the sliding direction (G) extends in a plane which is defined by the second louvre axis (38*a*) and by the projection direction (V), wherein the first louvre axis does not lie within the plane.

2. An air guiding device (10) according to claim 1, wherein, in a situation in which the air guiding device (10) is fitted in the motor vehicle, the first and second louvre axes (34*a*, 38*a*) are tilted relative to one another both in the projection onto a plane perpendicular to the longitudinal direction of the vehicle and in the projection onto a plane parallel to a carriageway.

3. An air guiding device (10) according to claim 1, wherein the first transmission member (44) extends parallel to the first louvre axis (34*a*) and/or the second transmission member (48) extends parallel to the second louvre axis (38*a*).

4. An air guiding device (10) according to claim 3, wherein the first transmission member (44) extends collinearly to the first louvre axis (34*a*) and/or the second transmission member (48) extends collinearly to the second louvre axis (38*a*).

5. An air guiding device (10) according to claim 1, wherein one coupling end piece (48*e*) is configured as a coupling inner part (51), and the other coupling end piece (44*e*) is configured as a coupling outer part (53), the coupling inner part (51) being accommodated at least in part in the coupling outer part (53).

6. An air guiding device (10) according to claim 5, wherein the one coupling end piece (48*e*) is configured as the coupling inner part (51) in a manner of a joint head (52), and the other coupling end piece (44*e*) is configured as the coupling outer part (53) in a manner of a joint socket (50).

7. An air guiding device (10) according to claim 1, wherein the first transmission member (44) and/or the second transmission member (48) are each configured in one piece.

8. An air guiding device (10) according to claim 1, wherein the transmission means (36) comprises a plurality of coupling projections (58) and a plurality of coupling recesses (54), each coupling projection (58) being engaged with an associated coupling recess (54).

9. An air guiding device (10) according to claim 8, wherein a transmission member (48) comprises a coupling end piece (48*e*), in which a plurality of coupling recesses (58) are formed, which are provided on the coupling end piece (48*e*) at equidistant angular distances about the louvre axis (38*a*) of the louvre (38) associated with this transmission member (48).

10. An air guiding device (10) according to claim 8, wherein a transmission member (44) comprises a coupling end piece (44*e*), in which a plurality of coupling recesses (54) are formed, which are provided on the coupling end piece (44*e*) rotationally symmetrically relative to the louvre axis (34*a*) of the associated louvre (34).

11. An air guiding device (10) according to claim 1, wherein the first and second transmission members (44, 48) are configured for coupling together by plugging or screwing together, and in that a catch element (60) is provided at least on one of the transmission members (44), which catch element prevents the transmission members (44, 48) from becoming uncoupled from one another.

12. An air guiding device (10) according claim 1, wherein the sliding direction (G) has (a) an angular component perpendicular to the first louvre axis (34*a*).

13. An air guiding device (10) according to claim 12, wherein one of the transmission members is provided on the associated louvre axially adjustably relative to the louvre axis of said louvre.

14. An air guiding device (10) according to claim 1, wherein the first louvre (34) is part of a first louvre arrangement (22), which comprises a plurality of louvres (26) coupled for movement transmission, whose louvre axes (26*a*) extend parallel or collinearly to the first louvre axis (34*a*).

15. An air guiding device (10) according to claim 1, wherein the second louvre (38) is part of a second louvre arrangement (24), which comprises a plurality of louvres (28) coupled for movement transmission, whose louvre axes (28*a*) extend parallel or collinearly to the second louvre axis (38*a*).

\* \* \* \* \*